Jan. 5, 1960  N. A. KOSS  2,920,242
ELECTRIC CIRCUIT
Filed Dec. 5, 1957

Inventor:
Norman A. Koss,
by J Wesley Haubner
His Attorney.

United States Patent Office 2,920,242
Patented Jan. 5, 1960

2,920,242

ELECTRIC CIRCUIT

Norman A. Koss, Philadelphia, Pa., assignor to General Electric Company, a corporation of New York Application December 5, 1957, Serial No. 700,823

7 Claims. (Cl. 317—36)

This invention relates to electric circuits, and more particularly to an improved electric circuit adapted to control an electroresponsive device in preselected inverse-time response to the magnitude of a single energizing quantity. The term "inverse-time" is used to characterize a circuit in which response or operating time varies inversely with respect to the magnitude of the quantity to which the circuit responds.

It is a general object of this invention to provide a relatively compact and inexpensive electric circuit suitable for general application in the field of protective relays, particularly protective relays of the inverse-time overcurrent or overvoltage type.

It is a common practice to use cooperating protective relays in alternating current electric power distribution systems and the like to provide adequate protection against all possible system disturbances or faults. The various protective relays used must be properly coordinated with each other in order to minimize system interruptions and prevent unnecessary loss of service during abnormal conditions involving only a part of the whole system. To obtain proper selective operation among cooperating relays of the inverse-time type, it is important that the inverse-time characteristic of each relay be selected in accordance with the requirements of the particular system being protected. Such requirements are likely to vary from system to system, and thus there is a need for inverse-time relays having many different degrees of inverseness, that is, differently shaped time curves. Accordingly, another object of this invention is to provide an improved electric circuit of the type described having a very broad range of conveniently selectable inverse-time operating characteristics.

In conventional inverse-time overcurrent relays, the means provided to obtain time delay during relay operation is equally effective to delay the resetting of the relay, i.e., the return to a normal state after partial or complete operation in response to an overcurrent condition which has subsided. This delayed resetting may be highly undesirable, since a rapid succession of two or more overcurrent conditions may cause the relay to operate too quickly in response to the second and subsequent overcurrent conditions, whereby proper coordination with other protective relays is lost. Still another object of the invention, therefore, is the provision, in an electric circuit of the type described, of improved means for obtaining quick reset.

In carrying out the invention in one form, I provide means for deriving a relatively smooth, unidirectional operating voltage which is representative of the magnitude of a variable energizing quantity such as alternating current in an electric power circuit. I provide suitable time delay means operative when the energizing quantity increases to delay the resulting rise in operating voltage in inverse proportion to the total change produced. For obtaining quick reset, the time delay means includes an asymmetric circuit element arranged to permit relatively rapid decay of operating voltage whenever the energizing quantity decreases. I also provide means for deriving a relatively smooth, unidirectional reference voltage having a non-linear relationship to the magnitude of the energizing quantity. The operating and reference voltages are applied in series opposing relationship across a pair of output terminals. An electroresponsive device which operates only in response to voltage of one polarity may be connected to the output terminals, and this device will be operably energized when the operating voltage rises above the reference voltage.

My invention will be better understood and its various objects and advantages will be more fully appreciated from the following description in conjunction with the accompanying drawing in which.

Figure 1:
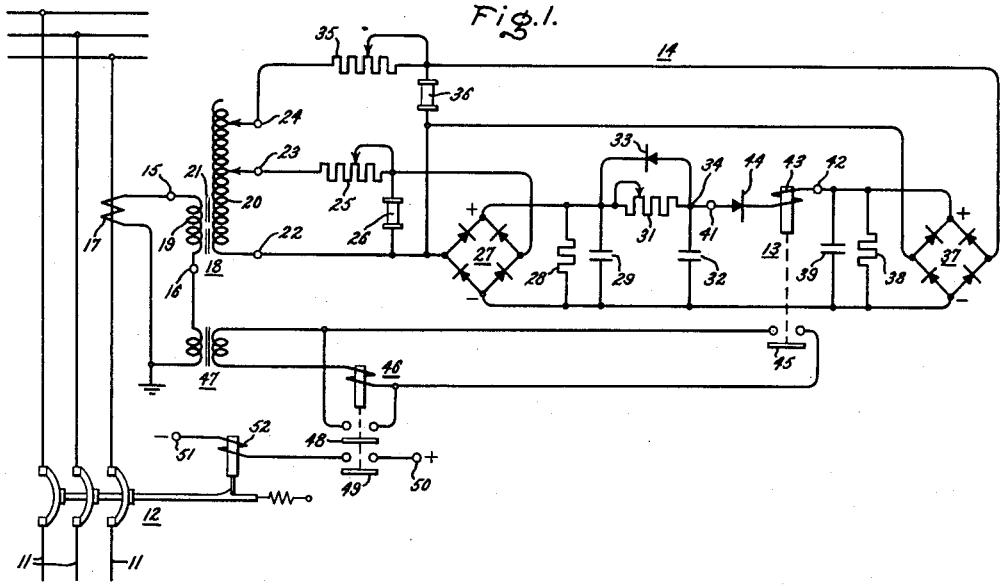
Fig. 1 is a schematic diagram of an overcurrent protective relay which illustrates a preferred embodiment of my invention.

Referring now to Fig. 1, I have shown my invention applied, by way of example, to protective means for an alternating current electric power circuit 11 containing a latched-closed circuit breaker 12. It is desired to open the breaker 12 in response to overcurrent in the circuit 11 and with a time delay varying inversely with the magnitude of the overcurrent.

To this end, I control the circuit breaker 12 by means of a sensitive electromagnetic relay 13 which in turn is controlled by means of an electric circuit 14 constructed in accordance with my invention. This electric circuit 14 includes a pair of input terminals 15 and 16 which, in the illustrated embodiment of the invention, are connected to the secondary circuit of a suitable current transformer 17 for energization in accordance with alternating electric current flowing in the electric power circuit 11. The magnitude of this circuit current is normally variable in accordance with the amount of load being supplied and other circuit conditions.

The electric circuit 14 illustrated in Fig. 1 includes suitable transforming means 18 which preferably comprises a primary winding 19 connected across the input terminals 15 and 16, a secondary winding 20, and a common iron core 21 having at least one air gap. One end of the secondary winding 20 is connected to a fixed terminal 22, and the secondary winding is provided with a plurality of points suitable for selectable connection to two adjustable taps 23 and 24. The illustrated transforming means 18 derives across the tapped portions of its secondary winding 20, voltages which are directly proportional to the magnitude of energizing current in the electric power circuit over a wide range of current magnitudes. No D.-C. component of current will be reproduced in the secondary voltage. The transforming means 18 also serves as a desirable means for electrically insulating the electric circuit 14 from the current transformer connections.

As has been pointed out in the objects stated hereinbefore, my invention may in the alternative be adapted to respond to overvoltage, in which case the input terminals 15 and 16 would be energized in accordance with alternating electric voltage in the power circuit 11. In this alternative, the transforming means 18 would be unnecessary, and a simple potentiometer or the like (not shown) may be connected across the input terminals 15 and 16 to provide voltages directly proportional to the power circuit voltage.

In accordance with my invention, it is desired to convert the voltage of transforming means 18 into a relatively smooth, unidirectional signal voltage which is representative of the energizing quantity. I obtain this signal voltage in the illustrated embodiment of the invention by means of an adjustably tapped resistor 25, a circuit element 26, a full-wave bridge type rectifier 27, and a smoothing circuit comprising resistor 28 and capacitor 29, as shown in Fig. 1.

The tapped resistor 25 and circuit element 26 are connected in series circuit relationship between terminal 22 and adjustable tap 23 of the secondary winding 20. Element 26 preferably has a non-linear current-voltage characteristic, that is, the ohmic value of this element actually decreases as the voltage applied across it increases so that current will increase at a greater rate than voltage. Many such non-linear current-voltage characteristic elements are known in the art, and for the purposes of the illustrated embodiment of my invention I prefer at present to use a special ceramic resistance material comprising silicon carbide crystals held together by a suitable binder, such as described in United States Patent 1,822,742 issued to Karl B. McEachron on September 8, 1931. The non-linear characteristic of such element may be represented generally by the formula $E^b R = K$, where E is the applied voltage, R is the impedance of the element expressed in ohms, and $b$ and K are predetermined constants. For the purposes of my invention, I select a circuit element 26 having appropriate constants $b$ and K to provide the particular nonlinear characteristic desired.

The circuit element 26 is connected across the alternating current terminals of the full-wave bridge type rectifier 27. The smoothing circuit comprising the parallel combination of resistor 28 and capacitor 29, as is shown in Fig. 1, is connected across the direct current terminals of rectifier 27. The relatively smooth, direct voltage which is produced across capacitor 29 will be referred to as the signal voltage. The values of resistance 28 and capacitance 29 of the smoothing circuit may be selected to provide a relatively small time constant, i.e., a time constant in the order of 2 or 3 cycles on a 60 cycles per second basis. Thus, any change in the amplitude of alternating voltage applied to the alternating current terminals of rectifier 27 will be quickly reflected by a corresponding change in the magnitude of the unidirectional signal voltage.

Figure 2:
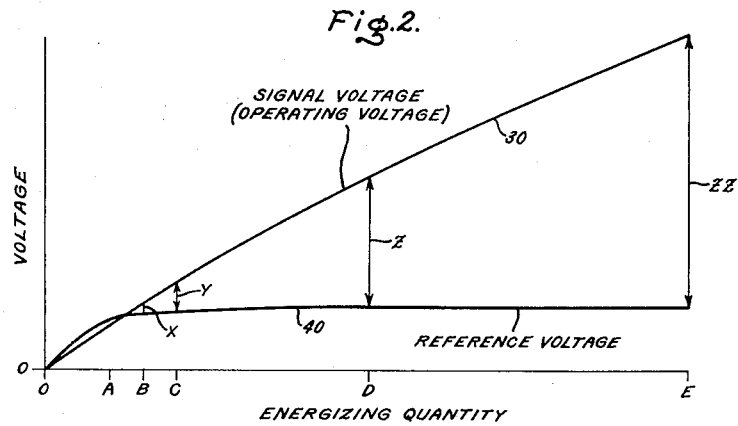
Fig. 2 is a graphical representation of certain voltage relationships obtained in the illustrated embodiment of the invention.

The magnitude relationship between the energizing quantity (the current in power circuit 11) and the representative signal voltage is determined by the selection and settings of the various circuit components 17–29 described above. These selections and settings may conveniently be made ot produce, for example, the predetermined non-linear relationship illustrated by curve 30 in Fig. 2. The abscissa of Fig. 2 represents the amplitude of the energizing quantity, while the ordinate represents voltage magnitude. As shown, the rate of change of signal voltage with respect to the energizing quantity is a variable, gradually lessening as the energizing quantity increases.

As long as the signal voltage is truly representative of the energizing quantity, it is not essential to the successful performance of my invention that the relationship therebetween be non-linear. However, the non-linear relationship offers an advantage in that it limits the signal voltage to a desired maximum magnitude at extremely high levels of energizing quantity. As will become apparent later in the specification, it also provides one means for conveniently controlling the degree of inverseness of the inverse-time operating characteristic of circuit 14.

Referring again to Fig. 1, an energy storing timing circuit preferably comprising the series combination of an adjustably tapped resistor 31 and a capacitor 32 is connected across capacitor 29 of the smoothing circuit. If desired, a variable capacitor could be substituted for the fixed capacitor 32 illustrated in the drawing. The direct voltage appearing across capacitor 32 is designated the operating voltage of my improved electric circuit. Under steady state conditions, the operating voltage is substantially equal to the signal voltage, but when the magnitude of the signal voltage increases, the timing circuit is operative to delay the resulting change in operating voltage. The total resistance of resistor 31 and the capacitance of capacitor 32 are selected to provide a relatively large time constant, i.e., in the order of one or more seconds, and by appropriate adjustment of resistor 31 the effective time constant of the timing circuit may be varied over a wide range. The time constant selected fixes the length of time required, following any abrupt increase in signal voltage, for capacitor 32 to charge to 63.2 percent of the total increase to be realized.

The timing circuit includes an asymmetric circuit element, such as the half-wave rectifier 33 illustrated in Fig. 1, connected across resistor 31. This element is poled so as to provide a shunt path of negligible impedance around resistor 31 for current flowing from the positive terminal 34 of capacitor 32 through resistor 28. Thus, the timing circuit is inactive and capacitor 32 will discharge rapidly whenever the signal voltage decreases. However, element 33 does not significantly affect the delayed buildup of operating voltage across capacitor 32 in response to increased signal voltage.

In accordance with my invention, a realtively smooth, unidirectional reference voltage having a non-linear relationship to the energizing quantity is provided. In the illustrated embodiment of the invention, this reference voltage is derived from transforming means 18 by means of an adjustably tapped resistor 35, a non-linear circuit element 36, a full-wave bridge type rectifier 37, and a smoothing circuit comprising resistor 38 and capacitor 39, as shown in Fig. 1.

The tapped resistor 35 and the non-linear circuit element 36 are connected in series circuit relationship between terminal 22 and adjustable tap 24 of the secondary winding 20. The non-linear circuit element 36 may be of any suitable type, but preferably it is similar to the resistance element 26 described hereinbefore. I select a circuit element 36 having appropriate constants $b$ and K to provide the particular non-linear characteristic desired.

The non-linear circuit element 36 is connected across the alternating current terminals of the full-wave bridge type rectifier 37. The smoothing circuit comprising the parallel combination of resistor 38 and capacitor 39, as is shown in Fig. 1, is connected across the direct current terminals of rectifier 37. The relatively smooth, direct voltage produced across capacitor 39 will be referred to as the reference voltage. The values of resistance 38 and capacitance 39 of the smoothing circuit are selected to provide a relatively small time constant. Thus, any change in the amplitude of alternating voltage applied to rectifier 37 will be quickly reflected by a corresponding change in the magnitude of the unidirectional reference voltage. But it is important that the time constant of the discharge path for capacitor 39 be greater than the time constant of the discharge path for capacitor 32. As will become apparent later in the specification, this will prevent false operation of my electric circuit when the energizing quantity decreases.

The magnitude relationship between the energizing quantity (the current in power circuit 11) and the reference voltage is determined by the selection and settings of the various circuit components 17–24 and 35–39 described above. These selections and settings may conveniently be made to produce, for example, the predetermined non-linear relationship illustrated by curve 40 in Fig. 2. The non-linear relationships of the signal and reference voltages to the energizing quantity, respectively indicated by the curves 30 and 40, are coordinated with each other so that signal voltage increases more than reference voltage as the energizing quantity increases above a predetermined level A. It will be apparent from Fig. 2 that the non-linear circuit element 36 acts to severely limit the maximum magnitude of reference voltage obtained at the higher values of energizing quantity.

In accordance with my invention, it is necessary that the reference voltage bear a non-linear relationship to the energizing quantity throughout substantially the entire range of magnitude variation normally experienced by this quantity. However, it is not essential to the successful performance of the invention that the reference voltage be derived from the energizing quantity, and other means, such as a battery (not shown) may be used to provide a reference voltage of relatively constant characteristics. The specific arrangement shown offers advantages in being conveniently adjustable and independent of an external source of voltage.

The reference and operating voltages produced in the electric circuit 14 are serially applied in polarity opposing relationship to a pair of output terminals 41 and 42. This is accomplished, as can be seen in Fig. 1, by interconnecting the negative terminals of capacitors 32 and 39 and by connecting the positive terminals of these capacitors to the output terminals 41 and 42 respectively. Thus, the net voltage which energizes the output terminals of the electric circuit 14 comprises the voltage difference between the operating and reference voltages.

The output terminals 41 and 42 are connected to an operating winding 43 of the sensitive electromagnetic relay 13 which is controlled by the electric circuit. A unilaterally conductive element, such as the half-wave rectifier 44 illustrated, is connected in series with winding 43 so that this winding can respond only when the difference voltage across the output terminals is of a given polarity. The rectifier 44 is poled to permit operable energization of relay 13 only when output terminal 41 is positive with respect to terminal 42, or in other words, when the operating voltage exceeds the reference voltage. It will be apparent to those skilled in the art that the same unilateral response could be obtained by using a suitable polarized relay coil in lieu of the combination of rectifier 44 and winding 43.

The relay 13 will operate whenever its winding 43 is energized by voltage greater than a predetermined minimum amount. Since relay 13 is very sensitive, this minimum level of response is extremely low. A normally open contact 45 is closed upon operation of relay 13, and this contact completes a circuit for supplying energizing current to an auxiliary relay 46. The energizing circuit for relay 46 may be supplied by means of an auxiliary transformer 47 connected in series with primary winding 19 in the secondary circuit of current transformer 17, as is shown in Fig. 1, or by any other available source of current.

When energized, auxiliary relay 46 operates to close a seal-in contact 48 which is connected in parallel with contact 45. This relieves contact 45 of the duty of holding relay 46 energized until the protective function has been completed. Auxiliary relay 46 also operates to close its contact 49 which connects a pair of energizing terminals 50 and 51 to a trip coil 52 of the circuit breaker 12. As a result, breaker 12 is opened and the power circuit 11 disconnected. The auxiliary relay 46 is employed because its contact 49 is better able than contact 45 to carry the relatively high current drawn by trip coil 52.

Figure 3:
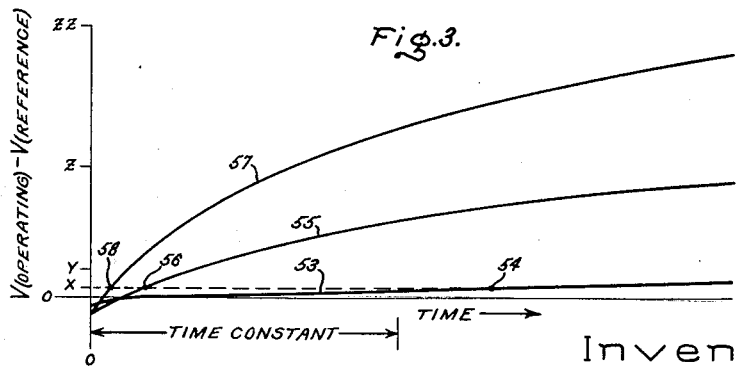
Fig. 3 is a chart of time-voltage characteristics obtained in accordance with the invention.

From the foregoing detailed description of the components and interconnections of my improved electric circuit 14, its mode of operation may now be readily followed. Reference will be made to Figs. 2 and 3, Fig. 3 being a time-voltage chart wherein the voltage across output terminal 41 and 42, comprising the reference voltage subtracted from the operating voltage, is plotted against time.

It will be assumed that the energizing quantity, which in the illustrated embodiment of the invention is the current in power circuit 11, normally is of the value A, as indicated in Fig. 2, and that operation of electromagnetic relay 13, and consequently opening of the circuit breaker 12, is desired whenever the current rises to a level B and above. Accordingly, the various circuit components are selected and adjusted so that when B current flows in the power circuit, the representative signal voltage developed across capacitor 29, and hence the operating voltage across capacitor 32 under steady-state conditions, will exceed the reference voltage across capacitor 39 by an amount just equal to the predetermined minimum level of response of relay 13. This predetermined amount is shown as X in Fig. 2. It may be observed that with normal A current in the power circuit, the signal or operating voltage is actually less than the reference voltage, and the difference voltage is negative.

In response to the occurrence of a fault causing power circuit current to increase abruptly to about twice its normal value, or C in Fig. 2, signal voltage increases more than reference voltage and will exceed reference voltage by an amount Y which is sufficient to operate relay 13. However, this voltage difference will not appear immediately across the output terminals 41 and 42 of electric circuit 14, because the corresponding increase of operating voltage is retarded by the timing circuit.

The difference voltage across the output terminals of electric circuit 14 for the overcurrent condition C has been indicated with respect to time by curve 53 in Fig. 3. As shown, the difference voltage will increase exponentially from its initial negative value as the operating voltage rises in delayed response to the overcurrent condition. The initial 63.2 percent of the ultimate change in operating voltage takes place during a period of time corresponding to the preselected time constant of the timing circuit. Eventually, the difference voltage will rise above the predetermined minimum level X required for relay operation, and at this moment, which is indicated by point 54 in Fig. 3, relay 13 operates.

In the event that a more severe fault condition should cause the energizing current to increase abruptly to about five times its normal value, or D in Fig. 2, the difference voltage can be illustrated in Fig. 3 by curve 55. Again the initial 63.2 percent of the ultimate change in operating voltage takes place during the same time-constant, but this precentage now represents a larger amount of voltage. Consequently, the difference voltage will attain the predetermined level X (point 56 in Fig. 3) and relay 13 will operate in a period of time much shorter than the time required to respond to the overcurrent condition C. Similarly, for a current E about ten times normal, the difference voltage can be represented in Fig. 3 by curve 57, and the difference voltage reaches its critical level X at a point 58 more quickly than was possible for overcurrent conditions C or D.

Inspection of Fig. 3 will reveal that an electric circuit constructed in accordance with my invention has an inverse-time operating characteristic. As the energizing quantity increases, the time of response becomes less. The inverse-time characteristic can be conveniently varied over a very broad range by appropriate selection of the time constant of the timing circuit. The particular inverse-time characteristic obtained is also affected by the selection of non-linear circuit element 36 and the adjustment of resistor 35, and the selection and adjustment of elements 26 and 25, respectively, will determine the maximum operating voltage and thus influence the minimum time delay obtainable under the more extreme overcurrent conditions.

After relay 13 has operated to open circuit breaker 12, or in the event that an overcurrent condition subsides before the circuit 14 has had sufficient opportunity to complete its response, the operating voltage will quickly decay to at least its normal magnitude. The asymmetric circuit element 33 included in the timing circuit, as has been explained hereinbefore, makes this quick reset possible. As a result, the electric circuit 14 is able to respond accurately and with proper time delay to each of a rapid succession of overcurrent conditions.

As pointed out hereinbefore, care must be exercised in selecting values of circuit components to ensure that the time constant of the discharge path for capacitor 39 is greater than the time constant of the discharge path for capacitor 32. This will enable the operating voltage to decay more rapidly than the reference voltage following a momentary overcurrent condition which has caused only a partial response in circuit 14. If the reference voltage were permitted to decay more rapidly, it might reach a level sufficiently below the more slowly decaying operating voltage to cause false operation.

While I have shown and described a preferred form of my invention by way of illustration, many modifications will occur to those skilled in the art. I therefore contemplate by the claims which conclude this specification to cover all such modifications as fall within the true spirit and scope of my invention.

What I claim as new and desire to secure by Letters Patent of the United States is:

1. An electric circuit comprising; input terminals adapted to be energized by an electric quantity; means coupled to said input terminals for deriving an operating voltage representative of the magnitude of said electric quantity; timing means coupled to said operating voltage deriving means to retard changes in the magnitude of said operating voltage; means for deriving a reference voltage having a non-linear relationship to the magnitude of said electric quantity; output terminals; and circuit means arranged to apply said operating and reference voltages in polarity opposing relationship to said output terminals.

2. An electric circuit comprising; input terminals adapted to be energized by an alternating electric quantity; voltage producing means, including a resistance element having a non-linear current-voltage characteristic, coupled to said input terminals for producing a first relatively smooth direct voltage representative of the amplitude of said alternating quantity and a second relatively smooth direct voltage having a predetermined non-linear relationship to the amplitude of said quantity; energy storing means asasociated with said voltage producing means to delay the resulting change of said first voltage whenever the amplitude of said quantity changes abruptly; output terminals; and circuit means connected between said output terminals and said voltage producing means to apply said first and second voltages to said output terminals in series opposing relationship.

3. In a control system adapted to effect energization of a unilaterally responsive device in delayed response to a variable electric quantity exceeding a predetermined magnitude; a pair of input terminals adapted to be energized by said electric quantity; means coupled to said terminals for deriving a unidirectional operating voltage representative of the magnitude of said electric quantity under steady state conditions; time delay means coupled to said operating voltage deriving means and operative, whenever the magnitude of said electric quantity increases abruptly, to delay the resulting increase of said operating voltage as an inverse function of the total increase to be realized; means providing a unidirectional reference voltage of relatively constant characteristics; a pair of output terminals adapted to be connected to the device to be energized; and circuit means for applying said operating and reference voltages in series opposing relationship across said output terminals; whereby said device is effectively energized whenever the operating voltage rises a predetermined amount above said reference voltage.

4. In an electric circuit; input terminals adapted to be energized by an electric quantity of variable magnitude; means coupled to said input terminals for deriving an operating voltage having a first preselected non-linear relationship to the magnitude of said electric quantity; time delay means coupled to said operating voltage deriving means to delay build up of said operating voltage following an increase in the magnitude of said electric quantity, said time delay means including an asymmetric circuit element connected to permit relatively rapid decay of said operating voltage whenever the magnitude of said electric quantity decreases; means for deriving a reference voltage having a second preselected non-linear relationship to the magnitude of said electric quantity, said first and second non-linear relationships being selected so that said operating voltage increase more than said reference voltage in response to any increase of said electric quantity magnitude above a predetermined level; output terminals; and circuit means arranged to apply said operating and reference voltages in series opposing relationship to said output terminals.

5. A control system adapted to effect energization of a unilaterally responsive device in delayed response to a variable electric quantity exceeding a predetermined magnitude, comprising; a pair of input terminals adapted to be energized by said electric quantity; means coupled to said terminals for deriving a unidirectional signal voltage representative of the magnitude of said electric quantity; timing means connected to said signal voltage deriving means for producing an operating voltage which is equivalent to said signal voltage during steady state conditions and rises in delayed response to increasing signal voltage, said timing means including an asymmetric circuit element for permitting relatively rapid decay of said operating voltage in response to decreasing signal voltage; means providing a unidirectional reference voltage having a predetermined non-linear relationship to the magnitude of said variable electric quantity throughout substantially the entire range of its variation; a pair of output terminals adapted to supply energization to the unilaterally responsive device; and circuit means connected to apply said operating and reference voltages in polarity opposing relationship across said output terminals; whereby said unilaterally responsive device is effectively energized whenever said operating voltage rises a predetermined amount above said reference voltage.

6. An inverse-time overcurrent relay adapted to energize an electroresponsive device in response to excessive current in an alternating current electric circuit, comprising; first means responsive to the circuit current for producing a first direct voltage representative of the magnitude of circuit current, said first means including timing means effective during increases in current magnitude to retard the corresponding increases in the magnitude of the first direct voltage; second means responsive to the circuit current for continuously producing a second direct voltage having a predetermined non-linear relationship to current magnitude; and circuit means, including said first and second means interconnected in series and oppositely poled, adapted for connection to the electroresponsive device to form a circuit wherein the magnitude and direction of energizing current is determined by the relative magnitudes of said first and second direct voltages.

7. An electric circuit comprising: a pair of input terminals adapted to be energized by an electric quantity of variable magnitude; voltage producing means, including two separate non-linear circuit elements, coupled to said input terminals for producing two direct voltages each having a different non-linear magnitude relationship to said electric quantity, the magnitude of one of said direct voltages exceeding by at least a predetermined amount the magnitude of the other direct voltage whenever the magnitude of said electric quantity rises above a predetermined level; timing means associated with said voltage producing means and operative when the magnitude of said electric quantity increase to delay the change resulting in said one direct voltage in inverse relation to the amount of such increase; output terminals; and circuit means connected between said output terminals and said voltage producing means to supply said direct voltages to said output terminals in polarity opposing relationship, whereby said output terminals will be energized by a net voltage of at least said predetermined amount whenever said electric quantity increases above said predetermined level but only after a time delay determined by said timing means.

References Cited in the file of this patent
UNITED STATES PATENTS 2,735,962   Ellis _____ Feb. 21, 1956